United States Patent
Esswein et al.

(10) Patent No.: US 7,401,586 B2
(45) Date of Patent: Jul. 22, 2008

(54) VALVE SEAT RINGS MADE OF BASIC CO OR CO/MO ALLOYS, AND PRODUCTION THEREOF

(75) Inventors: Ernst Esswein, Kleinkarlbach (DE); Stefan Grau, Blaustein (DE); Tilmann Haug, Weissenhorn (DE); Alexander Sagel, Mosbach (DE)

(73) Assignee: Daimler AG, Stuttgart (DE)

( * ) Notice: Subject to any disclaimer, the term of this patent is extended or adjusted under 35 U.S.C. 154(b) by 121 days.

(21) Appl. No.: 10/566,624

(22) PCT Filed: Jul. 21, 2004

(86) PCT No.: PCT/EP2004/008137

§ 371 (c)(1),
(2), (4) Date: May 31, 2006

(87) PCT Pub. No.: WO2005/012590

PCT Pub. Date: Feb. 10, 2005

(65) Prior Publication Data

US 2007/0193546 A1    Aug. 23, 2007

(30) Foreign Application Priority Data

Jul. 30, 2003   (DE) .............................. 103 34 703

(51) Int. Cl.
   *F02N 3/00*   (2006.01)
   *B21K 1/22*   (2006.01)
(52) U.S. Cl. .................. 123/188.3; 123/188.8; 29/888.4
(58) Field of Classification Search .............. 123/188.3, 123/188.8, 188.11; 29/888.4, 888.044, 888.048, 29/888.46, 888.44; 251/368, 359; 75/246, 75/231, 247; 427/455, 456
See application file for complete search history.

(56) References Cited

U.S. PATENT DOCUMENTS

| | | | | |
|---|---|---|---|---|
| 4,724,819 A | * | 2/1988 | Fleri | 123/668 |
| 5,915,743 A | * | 6/1999 | Palma | 29/402.18 |
| 6,240,639 B1 | * | 6/2001 | Hycner | 29/895.32 |
| 6,763,576 B2 | * | 7/2004 | Watchko et al. | 29/825 |

FOREIGN PATENT DOCUMENTS

| | | |
|---|---|---|
| DE | 198 41 618 C2 | 12/2000 |
| EP | 0 227 634 A1 | 7/1987 |
| EP | 0 338 204 A2 | 10/1989 |
| EP | 0 927 816 A2 | 7/1999 |
| EP | 1 172 452 A2 | 1/2002 |
| JP | 01138095 A | 5/1989 |

OTHER PUBLICATIONS

Popoola et al.: "Novel Powertrain Applications of Thermal Spray Coatings," Surface Engineering, 1998, pp. 107-112, vol. 14, No. 2, The Institute Of Materials, London.

* cited by examiner

*Primary Examiner*—Stephen K. Cronin
*Assistant Examiner*—Hyder Ali
(74) *Attorney, Agent, or Firm*—Patent Central LLC; Stephan Pendorf

(57) ABSTRACT

A cylinder head for internal combustion engines, comprising a metallic valve seat ring that is formed by a thermally sprayed homogeneous layer made of a basic Co or Co/Mo alloy. The sum of the Co content and Mo content in the alloy exceeds 50 percent by weight while the Fe content lies below 5 percent by weight. Also disclosed is a method for thermally spraying said valve seat ring by means of an arc wire spraying process with the aid of at least two filler wires and/or composite wires, the essential Co portion in the deposited layer being delivered by the jacket of the filler wire and/or the matrix of the composite wire.

14 Claims, 1 Drawing Sheet

VALVE SEAT RINGS MADE OF BASIC CO OR CO/MO ALLOYS, AND PRODUCTION THEREOF

CROSS REFERENCE TO RELATED APPLICATION

This application is a national stage of PCT/EP2004/008137 filed Jul. 21, 2004 and based upon DE 103 34 703.8 filed Jul. 30, 2003 under the International Convention.

BACKGROUND OF THE INVENTION

1. Field of the Invention

The invention concerns cylinder heads for internal combustion engines with metallic valve seat rings, the valve seat rings comprised of an arc wire sprayed Co/Mo base alloy, as well as an arc wire spray process with one or more metallic filled wires.

Cylinder heads are stressed in local areas, in particular at their valve seats, to the limits of their thermal or mechanical capacity. This has the consequence, that a local breakdown can occur, which can be recognized for example by cracks and/or tribologic wear.

Particularly in cylinder heads in light or heavy metal engineering, valve seat rings of enduring material are form-fittingly introduced by pressing into highly stressed areas. For these valve seat rings, Co and Co/Mo base alloys are of particular interest. These alloys characterize themselves by partial exceptional high hardness and very high friction wear resistance. For this reason, one of the fields of application of these alloys is in armor plating technology. A great disadvantage in this approach is the necessity to manufacture and fit the valve seat rings individually. In particular, for the very hard Co/Mo base alloys, very extensive process steps are necessary in order to achieve the required manufacturing precision.

For reducing these process steps there is proposed for example in U.S. Pat. No. 4,661,371 a process in which a protection layer is applied onto a specially prepared contact surface between valve and valve seat. This occurs by thermal spraying of a powder mixture of ceramic and metal particles, wherein the formed layer exhibits a gradiated composition, whereby a quasi ceramic cover layer is formed. The formed layers however do not exhibit optimal material characteristic.

From DE 100 41 974 A1 a process for depositing protective layers is known, in which as the powder particles a powder mixture of at least three powder components is employed. A first powder component is comprised of a Fe, Co or Ni base alloy, a second powder component is preferably formed of Mo or refractory metal sulfide and a third powder component includes preferably Cu, Al or Ag. For the illustrated process, or, as the case may be, the therewith formed layer, it is essential that the individual powder components are not melted together with each other and no alloys of the various powder components are formed. Only thereby can the individual functional characteristics (hardness, lubricity and thermal conductivity) of the employed components be retained in the layer. The powders are deposited for example by a HVOF process or by gas compacting. In the area of the highest load or stress, the hardness of the layer is in part found to be insufficient.

SUMMARY OF THE INVENTION

It is thus the task of the invention to provide metallic valve seats of high hardness and friction wear resistance, which can be applied by a simple process directly upon the cylinder head, as well as to provide processes for depositing the metallic valve seat rings as homogenous alloys upon a base or substrate material.

The task is solved by valve seat rings which are formed by thermal sprayed layers of a Co or Co/Mo base alloy in which the sum of the Co and Mo content is greater than 50 wt. % and in which the Fe content is in the range of from 0.5 to 5 wt. %, and an arc wire spray process with one or more metallic filled wires, of which the jacket contains the substantial portion of the Co to be deposited.

In accordance with the invention it is provided that the valve seat rings are made of the very hard and friction wear resistant (durable) Co and/or Co/Mo base alloys, wherein the valve seat rings are not individually produced and seated in the cylinder heads in the conventional manner, but rather are deposited directly upon the base or core material of the cylinder head. As deposit process, the arc wire spray process (LDS) is employed, wherein as the starting material it is not the alloy, but rather the components thereof that are employed, which during the depositing process form the desired alloy.

DETAILED DESCRIPTION OF THE INVENTION

Figure 1:
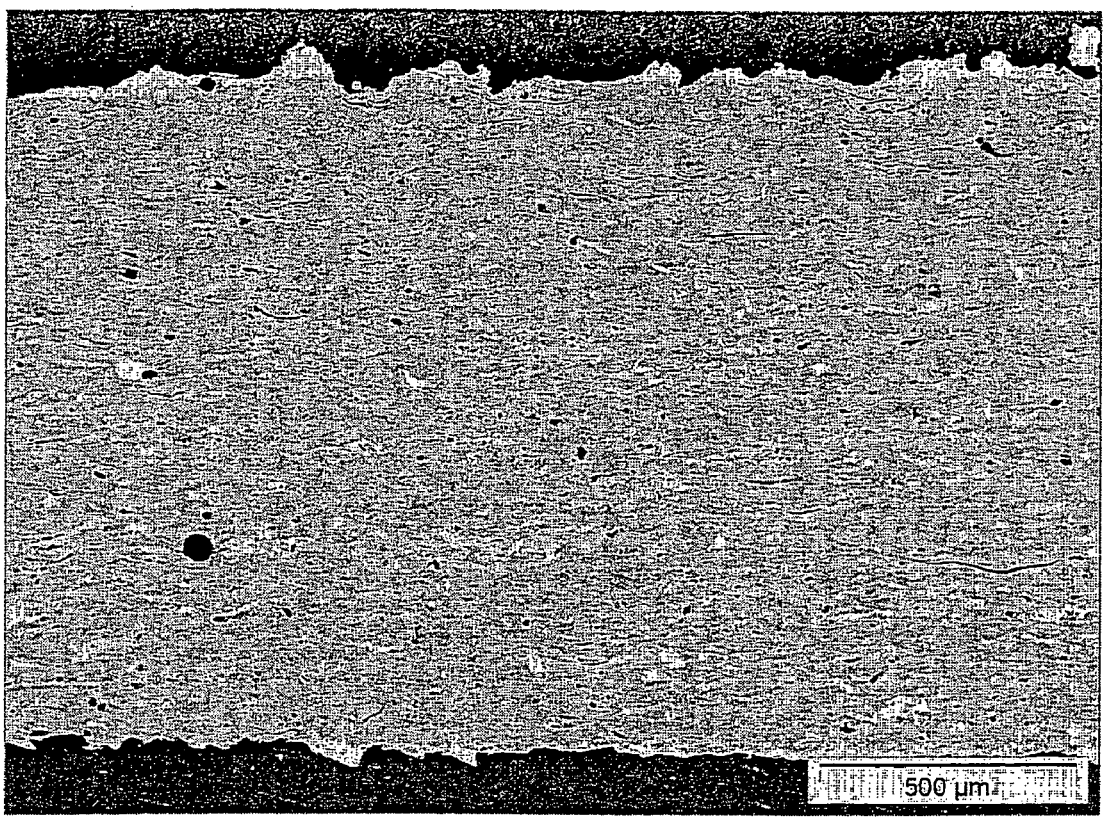
FIG. 1 Through-section of a thermal deposited valve seat ring.

The indicated percentiles of all indicated compositions are not limited to the precise recited numeric values, but should be considered to include also minor deviations.

Example

For producing a valve seat ring two identical filled wires are employed. The jacket of the filled wire is comprised of a Co/Fe-alloy with a Fe content of 3% and a core of metallic powder. The metallic powder contains therein 80 wt. % Mo, Si, as well as further powder particles.

The particle size of the employed powder particles lies in the range of approximately 3 to 100 µm.

The wire diameter of both wires is 3.6 mm.

The wires are supplied to a conventional wire spray device, and are melted in nitrogen in a discharge arc.

The depositing occurs on a steel substrate roughened by sandblasting with $Al_2O_3$.

The cut or through-section of a part of the thereby deposited valve seat ring is shown in FIG. 1.

Particularly preferred alloys for the inventive deposited valve seat rings include the Co or Co/Mo base alloys in which the Co and/or (Co+Mo) lies above 65 wt. %. Included within the term Co/Mo base alloys there is to be understood those compositions, which besides the Co have a Mo content in the range of respectively 20 to 40 wt. %, and among the Co base alloys those which besides Co can also include a Mo component of less than 10 wt. %.

As further typical alloy components, the alloys may contain at least one element of the group Cr, W, Ni, Fe, Si, Mn in an amount of 0.1 to 20 wt. %. Further, the impurities or insignificant components conventionally found in the corresponding metals can be present in trace amounts.

The proportion or content of metal oxides or metal nitrides in the inventive deposited valve seat rings lies below 2 Vol. %. Preferably the oxygen content of the alloys is below 1 wt. %.

The nominal composition (wt. %) of a particularly preferred Co base alloy is as follows:
C: 0.1 to 3%
Cr: 5 to 30%
W: 0 to 20%
Ni: 1 to 25%
Fe: 0.1 to 5%
Si: 0 to 4%
Mo: 0.5 to 3%
Mn: 0 to 1%
Co: the rest; however, at least 50%

The nominal composition (wt. %) of a particularly preferred Co/Mo base alloy is as follows:
C: 0.05 to 1%
Cr: 5 to 30%
W: 0 to 20%
Ni: 0 to 10%
Fe: 0.1 to 4%
Si: 0 to 4%
Mn: 0 to 1%
Mo: 5 to 35%
Co: the rest; however, at least 45%

Among the particularly preferred alloy compositions there are included in particular those alloys known as Tribaloy®, Stellite®, or Colmonoy®.

Further preferred embodiments of the alloy composition include, besides Co, 7 to 15 wt. % Cr, 20 to 30 wt. % Mo and 1 to 4 wt. % Si, or 25 to 32 wt. % Cr, 2 to 2.5 wt. % C, 1 to 4 wt. % Ni and 10 to 15 wt. % W.

In comparison to the corresponding cast alloys the inventive produced alloys in general exhibit a coarser microstructure.

By the very rapid cooling occurring upon the depositing of the spray particles upon the substrate, there is achieved in an advantageous manner an increase in the hardness and the friction wear resistance. Typically the Vickers hardness of the deposited valve seat rings is above 650 HV. Particularly preferably, the metallic valve seat rings exhibit a hardness of above 750 HV.

For friction wear resistance, besides the chemical composition, the microstructure of the surface layer is in particular of significance. Therein also the open porosity plays an important role. The inventive deposited layers preferably exhibit an open and/or closed porosity of less than 5%.

For the geometric design of the valve seat rings on the cylinder head the known dimensions can in general be adopted. On the basis of the good fit and bonding of the deposited valve seat rings, their thickness can however also be significantly reduced in comparison to the individually manufactured and fitted rings. The thickness of the sprayed material layer is preferably in the range of 0.1 to 2 mm.

In comparison to the cast seat rings employed until now, the inventive sprayed valve seat rings are significantly lighter, as well as less thick. Thereby, in advantageous manner, savings can be achieved in the relatively expensive raw materials Co and Mo.

A further aspect of the invention is concerned with the production process of the Co and/or Co/Mo base alloys by means of a thermal spray process. In accordance with the invention the valve seat ring is deposited directly upon the cylinder head by a process of arc wire spraying the components forming the alloys. Therein it is envisioned that the alloys are first formed during the process of spraying with corresponding individual or mixed components of the starting wire or as the case may be the starting or supply wires. The individual or non-alloyed components are therein supplied by one or more metallic filled wires in known manner into an arc. Thereby the mixing of the individual components as well as the formation of the preferred alloys takes place.

In the inventive preferred Co and Co/Mo alloys, these concern high melting materials, which are hardly available in wire form suitable for the thermal wire spray processes.

In accordance with the invention it is thus provided that the alloys are formed of at least two components during the spray process. This occurs by means of the filled wire technique, wherein each of the filled wires is formed of at least two components. In accordance with the invention one of the at least two components is essentially Co-metal. Preferably the Co content of this component is above 95 wt. %. Particularly preferred is when this component contains, besides Co, also Fe in an amount of 0.5 to 5 wt. %.

This Co-rich component forms in general the jacket of a filled wire filled with powder fill materials. In certain cases it can however be useful to employ a composite wire, which is formed of a Co rich matrix having further components dispersed therein. In distinction to filled wires with Co jacket, the composite wire exhibits metallic Co or Co alloys distributed over its entire cross section. The predominant portion of the further alloy components are therein surrounded or encapsulated by the Co matrix, or at least partially in contact therewith.

The further components of the alloys to be deposited lie as a rule in a powder form or dispersed in the fill wire. The further components can include one and/or more of the further alloy components. In certain cases it can also be useful to introduce small components of up to approximately 10% of the Co in powder form in the fill wire. This is in particular useful for alloys with a Co component above approximately 80%, since thereby the homogeneity of the deposited alloy can be further improved.

If the powder component includes multiple of the alloy components, then it is preferred that at least a part of the Ni and Cr component and/or the Cr and C component is formulated into the corresponding alloys or compositions.

In a particularly preferred embodiment of the invention the jacket of the fill wire is comprised of a Co/Fe alloy with a Fe content of 1 to 3% and a core of filler metal of unlike kind in powder form.

The wire diameter depends upon use and may be between 1.2 mm and 3.6 mm. The employed powder particles typically exhibit a size in the range of 3 to 100 μm.

In a further embodiment of the invention two wires are employed, a fill or composite wire and a solid wire, wherein the solid wire is comprised of at least one of the components constituting the filler of the filled wire. Preferably this solid wire is comprised of Ni or Cr or, as the case may be, their alloys.

A preferred method for forming the filled wires used in accordance with the invention begins with sheets or strips of Co. The Co strip has imparted to it powder-form components and in certain cases a solid wire, is partially rolled together parallel to its longitudinal axis, is crimped over, and then drawn to form the filled wire. In analogous manner it is also possible to fill Co pipes with the additional components and then to draw them into wires.

A further variant envisions using rollers to roll the filled pipes into bands, and to subdivide these into more or less flattened wires. This process produces, for example, the above described composite wires.

In a typical embodiment the arc wire spray process is carried out with two wires. Preferably therein two identical wires are employed, which particularly preferably have the same diameter and the same composition.

Depending upon availability of the metallic raw materials and the end product composition of the alloy of the valve seat ring, it could however also be advantageous to employ wires of differing constitution. This applies in particular in the case of a high Cr and/or Ni content of the target composition, where it is possible to employ besides a Co-rich fill wire also a Cr- and a Ni-rich wire. The wire can therein be a solid wire or in certain cases be a filled wire or composite wire.

In order to inhibit to the greatest extent possible the formation of oxides or other impurities during depositing, a protective or inert gas is preferably employed as process gas for the arc wire spraying. Particularly preferred therefore are $N_2$ or Ar.

It has been found that the valve seat rings applied by the inventive depositing process or, as the case may be, coatings of Co and/or Co/Mo base alloys, upon non-pretreated cylinder heads have good adhesion or bonding characteristics. In particular in order to further improve or adjust the surface characteristics or the adhesion of the deposited valve seat rings, it is of advantage to undertake a roughening of the surface of the metallic substrate of the cylinder head. This occurs conventionally by a jet or beam process, for example by sandblasting. For this, metallic, oxidic and in particular blasting agents based on SiC powders are particularly suitable.

By the composition of the alloy and the fine microstructure, valve seat rings or, as the case may be, layers, are made possible, which even with small layer thicknesses already exhibit the necessary thermal and mechanical load or stress tolerance. A particular advantage of the inventive process lies however in the producibility of very thick layers, up to quasi self supporting components. Thereby comparatively high or thick types of application are possible. The inventive process is particularly suited for example also for filling grooves, recesses, or bore holes in a substrate, and to compensate for non-planar surfaces.

The invention claimed is:

1. A process for producing a thermal sprayed valve seat ring, said process comprising;
    deposition the valve seat ring by an arc wire spray process, with a Co-rich filled wire and a Cr and/or Ni rich filled or solid wire, as a homogenous layer of a Co/Mo base alloy upon a substrate material of a cylinder head, wherein said filled wires comprise a jacket and a filler, and wherein a substantial proportion of the Co in the deposited layer is supplied by the jacket of the filled wire.

2. The process according to claim 1, wherein the thickness of the layer is between 0.1 and 2 mm, wherein the sum of the Co and Mo content is greater than 50 wt. % and wherein the Fe content is below 5 wt %.

3. The process according to claim 1, wherein the Cr content of the Co/Mo base alloy is from 5 to 30 wt. %.

4. The process according to claim 1, wherein the nominal chemical composition of the deposited layer in wt. % is: Mo 25 to 35%, Si 1 to 4%, Fe less than 3%, Cr 5 to 20%, C 0.05 to 1%, remainder Co and trace components of less than 1%.

5. The process according to claim 1, wherein the component of free Mo and/or Co not bound in the Co/Mo base alloy is below 10 Vol. %.

6. The process according to claim 1, wherein the porosity of the spray deposited layer is below 5%.

7. The process according to claim 1, wherein the Co/Mo base alloy has a Co content of at least 45 wt. %.

8. The process according to claim 1, wherein the thickness of the spray deposited layer is in the range of 0.5 to 2 mm.

9. The process according to claim 1, wherein the content of the metal oxides or metal nitrides in the spray deposited layer is below 2 wt %.

10. The process according to claim 1, wherein the jacket of the Co rich filled wire has a Co content above 90 wt. % and a Fe content in the range of 0.5 to 5 wt. %.

11. The process according to claim 1, wherein the filler of the Co rich filled wire essentially comprises Mo, Cr, Ni and/or Si.

12. The process according to claim 1, wherein the filled wire is produced from a Co strip or a Co pipe and wherein the filler metallic components are in powder form.

13. The process according to claim 1, wherein greater than 95% of the material of the filled wire, or solid wire transition into a molten phase during the arc wire spray process.

14. The process according to claim 1, wherein a carrier gas is employed in the arc wire spray process, and wherein said carrier gas is $N_2$ or Ar.

* * * * *